(12) United States Patent
Knutson

(10) Patent No.: US 11,365,801 B2
(45) Date of Patent: Jun. 21, 2022

(54) UTILITY VEHICLE HAVING ADAPTIVE DRIVE LIMITING CONTROL

(71) Applicant: Donovan Knutson, Slinger, WI (US)

(72) Inventor: Donovan Knutson, Slinger, WI (US)

( * ) Notice: Subject to any disclaimer, the term of this patent is extended or adjusted under 35 U.S.C. 154(b) by 343 days.

(21) Appl. No.: 16/554,550

(22) Filed: Aug. 28, 2019

(65) Prior Publication Data

US 2021/0062912 A1 Mar. 4, 2021

(51) Int. Cl.
| | |
|---|---|
| *F16H 59/10* | (2006.01) |
| *B62D 55/06* | (2006.01) |
| *E02F 9/20* | (2006.01) |
| *B62D 5/06* | (2006.01) |
| *E02F 9/22* | (2006.01) |
| *B62D 5/065* | (2006.01) |
| *B60K 17/356* | (2006.01) |
| *B62D 11/00* | (2006.01) |
| *B62D 11/04* | (2006.01) |
| *B62D 6/02* | (2006.01) |
| *F16H 61/44* | (2006.01) |

(52) U.S. Cl.
CPC ......... *F16H 59/105* (2013.01); *B60K 17/356* (2013.01); *B62D 5/062* (2013.01); *B62D 5/065* (2013.01); *B62D 11/001* (2013.01); *B62D 11/04* (2013.01); *B62D 55/06* (2013.01); *B62D 55/062* (2013.01); *E02F 9/2062* (2013.01); *E02F 9/225* (2013.01); *E02F 9/2253* (2013.01); *E02F 9/2296* (2013.01); *B60Y 2200/41* (2013.01); *B62D 6/02* (2013.01); *F15B 2211/782* (2013.01); *F16H 61/44* (2013.01)

(58) Field of Classification Search
CPC .. E02F 9/2253; F15B 11/0423; F16H 61/465; F16H 61/47; B62D 55/06; B62D 11/001
See application file for complete search history.

(56) References Cited

U.S. PATENT DOCUMENTS

| | | | |
|---|---|---|---|
| 6,148,939 A * | 11/2000 | Brookhart | B62D 11/183 180/333 |
| 6,766,236 B1 * | 7/2004 | Lamela | E02F 9/2029 180/6.3 |

(Continued)

FOREIGN PATENT DOCUMENTS

EP    1022395 A1    6/1999

*Primary Examiner* — Abiy Teka
(74) *Attorney, Agent, or Firm* — Wacker Neuson Amercia Corp.

(57) ABSTRACT

A utility vehicle such as a loader includes a drive control system that includes an electronic controller and a manually actuated drive command device, such as one or more joysticks. The electronic controller is configured to control the drive control system to supply propulsive power at a predetermined output that is lower than that which is commanded by the drive command device for so long as an output of the drive control system is beneath a designated threshold, maintaining vehicle speed lower than a commanded vehicle speed. The electronic controller is further configured to control the drive control system to ramp up the propulsive power supply toward that which is commanded by the drive command device when the output of the drive control system is above the designated threshold, causing the vehicle speed to approach a commanded vehicle speed. The vehicle may include a EH drive system such as a hydrostatic drive system.

20 Claims, 6 Drawing Sheets

(56) References Cited

U.S. PATENT DOCUMENTS

| | | |
|---|---|---|
| 6,863,144 B2 | 3/2005 | Brandt et al. |
| 7,273,125 B2 | 9/2007 | Schuh |
| 7,283,900 B1 | 10/2007 | Gacioch, Jr. et al. |
| 7,407,034 B2 | 8/2008 | Vigholm |
| 7,856,301 B2 | 12/2010 | Sjogren et al. |
| 8,108,109 B2 | 1/2012 | Young et al. |
| 8,364,356 B2 | 1/2013 | Young et al. |
| 8,660,763 B2 | 2/2014 | Peterson et al. |
| 8,746,395 B2 | 6/2014 | Frazier et al. |
| 9,435,104 B2 | 9/2016 | Juricak et al. |
| 9,809,248 B2 | 11/2017 | Bauer et al. |
| 10,220,843 B2 | 3/2019 | Coulter et al. |
| 2008/0083578 A1 | 4/2008 | Kelly et al. |
| 2009/0320462 A1* | 12/2009 | Ohtsukasa ............ F16H 61/421 60/431 |
| 2014/0174067 A1* | 6/2014 | Schulte ................ E02F 9/2246 60/327 |

* cited by examiner

UTILITY VEHICLE HAVING ADAPTIVE DRIVE LIMITING CONTROL

BACKGROUND OF THE INVENTION

1. Field of the Invention

The invention relates to utility vehicles such as loaders and, more particularly, relates to a utility vehicle having an adaptive drive control limiting system that scales operator drive commands as a function of commanded speed and drive output.

2. Discussion of the Related Art

Utility Vehicles have been widely adopted in a variety of industries including construction, landscaping, recycling, and agriculture. One class of these vehicles includes material handling vehicles such as compact skid steer loaders and track loaders. The size, power, and complexity of these machines has increased over time. These increases have driven an increase in the use of electronic over hydraulic (EH) drive control functions. These machines are operated using one or more controllers such as joystick(s), movement of which generate electric signals that are used by an electronic controller to control a hydraulic drive to operate the vehicle's drive system and possibly other systems such as dumping, digging, and/or digging tools. The hydraulic drive typically includes a hydrostatic pump assembly having one or more swash plates that can be electronically actuated to vary pump output to control propulsion.

EH drive systems allow an operator to operate a large machine for many hours with much less fatigue than the more traditional manual control systems. Unfortunately, EH drive systems have suffered from a number of controllability issues including lack of fine control at low speed, jerkiness, inability to accurately follow contours while grading, and abrupt accelerations. The controllability issues can hamper productivity, result in work of decreased quality, and negatively influence operator perception.

Systems have been proposed that address some of these issues by limiting the output based on prevailing input. The simplest such systems are simple speed limiters that limit the output to a percentage of, for example, 80% of maximum input. In a joystick operated drive system, vehicle speed is limited to 80% of maximum speed. The speed limit is invariably set by scaling the input to a fraction less than 100% at all times for a given operator-selected mode setting.

This control results in increase in fine controllability of the machine, lower maximum travel speeds, and makes the controls feel smoother and less jerky. The main drawback of this type of system is that the maximum speed of the machine is limited until the operator manually resets the speed limit to a higher value. This reset requirement results in decreased productivity for many operations, such as truck loading and excavating, which have alternating requirements of high travel speed without necessarily requiring fine control and low speed with fine control. This traditional speed limit function thus can only offer a compromise between these two requirements, or requires the operator to manually change between modes in an attempt to satisfy both requirements.

Other systems provide a user-selectable drive response. This concept typically allows the operator to select from a variety of preset response characteristics that affect acceleration and velocity ramping rates that range from low to high. The lower acceleration rates can make the vehicle controls feel smooth, but there is an increase in response time, lag, and delay between the command and the response. This increase can result in sluggish machine operation. The higher acceleration settings reduce response time, but at the expense of controls that can feel jerky and controllability can be compromised. In all cases, there is no change in the scaling of the operator inputs, so there is no increase in control resolution for fine control at low speeds.

Still another approach imposes transient drive system output limits. This concept, an example of which is disclosed to U.S. Pat. No. 8,239,104 (the '104 patent) granted to Clark Equipment Co., applies a variable drive system output limit that is time-based and selectable by the operator. As one example, if the operator gives a full speed 100% ahead command from standstill, the system first limits drive system output to less than 100%, and then gradually allows the output to increase to 100% over a period of time. One specific example disclosed in the '104 limits the initial output to 70% and allows the output to increase to 100% over 9 seconds. This control technique results in smoother feeling controls and it does allow full speed operation over time. It uses an output limit that caps the drive output when the drive command exceeds the output limit, but does not increase the controls input resolution of the control system at lower speeds and lower inputs. As a result, the system exhibits no increase in the fine controllability for smaller movements at lower travel speeds.

The need therefore has arisen to provide a drive control system and/or method for a utility vehicle such material handling machine that provides for smooth accelerations.

The need additionally has arisen to provide a drive control system and/or method for a utility vehicle that permits fine controllability at low operating speeds and rapid response at high operating speed.

SUMMARY

In accordance with a first aspect of the invention, a utility vehicle such as a skid loader or a track loader is provided that includes a chassis, at least first and second laterally-spaced driven ground supports, such as tracks or wheels, that support the chassis on the ground, an engine that is supported on the chassis, and a motive drive device that is supported on the chassis and that is operatively coupled to the engine and to at least one ground support. The motive drive device is configured to drive the at least one ground support to propel the vehicle over the ground. Also provided is a drive control system that includes an electronic controller and a manually actuated drive command device, such as one or more joysticks, that is electronically coupled to the electronic controller to generate a drive command signal a magnitude of which is dependent upon a degree of actuation of the drive command device. The electronic controller is configured to control the drive control system to supply power the motive drive device at a predetermined output that is lower than that that which is commanded by the drive command device for so long as an output of the drive control system is beneath a designated threshold, thereby maintaining vehicle speed lower than a commanded vehicle speed. The electronic controller is further configured to control the drive control system to ramp up the power supply to the motive drive device toward that which is commanded by the drive command device when the output of the drive control system is above the designated threshold, thereby causing the vehicle speed to approach a commanded vehicle speed.

The vehicle may include a EH drive system such as a hydrostatic drive system, in which case the motive drive device is a hydraulic motor. In this case the drive control system includes a pump that is driven by the engine and that has an output that is fluidically coupled to the hydraulic motor, and a pump output control device such as a swash plate that is in electronic communication with the electronic controller and that can be actuated to adjust pump output. The electronic controller is configured to deliver a pump output control signal to control the pump output control device to 1) scale pump output to a level to which is commanded by a drive command signal generated by the drive command device for so long as the pump output is below a designated level and to 2) ramp up the pump output toward the level that is commanded by the drive command device when the pump output rises above the designated level. Scaling may be thought of as occurring at all times, albeit with essentially 0 scaling and thus 0 speed limiting when the pump output exceeds the threshold level for a sufficiently long period of time for the scaling factor to increase to 100 percent (unity).

If the vehicle has a hydrostatic drive system of the type described above, the pump output level may be percentage of a maximum output. In this case, the pump output percentage may correspond to a percentage of the pump output control signal. In addition, the scaled pump output may be a designated percentage of a pump output percentage corresponding to a percentage of maximum propulsion speed commanded by the generated drive command signal. The electronic controller may be configured such that, when the pump output level rises above the designed level, the pump output rises at a linear or non-linear rate.

The threshold value and/or scaling factor may be factory pre-set and stored in the controller so as not to be alterable by a vehicle operator.

Also disclosed is a method of operating a utility vehicle having at least some of the characteristics described above.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
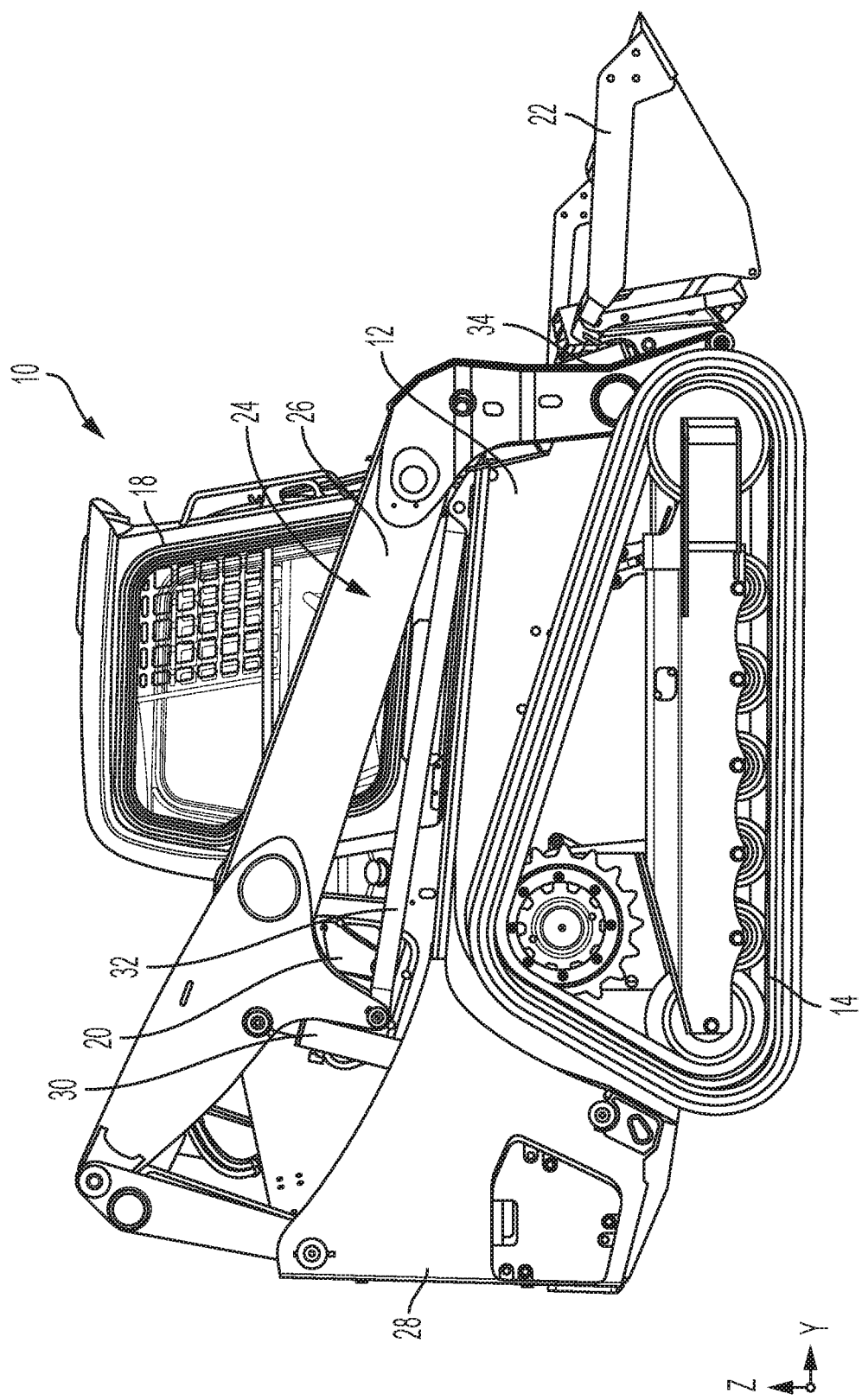
FIG. 1 is a side elevation view of a material handling machine in the form of a compact track loader incorporating a drive limiting control system constructed in accordance with an embodiment of the present invention.

Referring to the drawings and initially to FIG. 1, a utility vehicle machine 10 is illustrated that is fitted with a speed limited drive control system constructed in accordance with the present invention. The illustrated machine 10 is a track loader having a vertical lift arrangement. However, the concepts discussed herein apply equally to a track loader having a radial lift arrangement, as well as to other machines having manually actuated drive controls.

The illustrated machine 10 includes a chassis or frame 12 movably supported on the left and right ground via tracks, one of which is illustrate at 14. The frame 12 supports an operator's cab 18, an engine 20, and all electronic and hydraulic control systems required to propel the machine 10 and to control its powered devices. The frame 12 may be stationary relative to tracks or may be a platform that is mounted on a subframe so as to rotate about a vertical axis relative to the subframe to permit repositioning of the booms 26 (described below) relative to the subframe. Located within the cab 18 are a seat and controls (not shown) for operating all components of machine 10. These controls typically include, but are no way limited to, a throttle and one or more pedals, levers, joysticks, or switches, some of which are discussed below with reference to FIG. 2.

Still referring to FIG. 1, a bucket 22 is mounted on the frame 12 so as to be liftable relative to the frame 12 via a pair of opposed boom assemblies 24, only one of which is illustrated. Each boom assembly 24 is identical, consisting of a boom 26, a boom support assembly 28, a lift cylinder 30, and a link 32. As is generally known in the art, extension and retraction of the lift cylinders 30 raises and lowers each of the booms 26 about its rear end, with the links 32 constraining boom movement to more purely vertical movement than otherwise would be possible. The bucket 22 can be tilted relative to the booms 26 and thus relative to the frame 12 via a pair of left and right opposed double acting hydraulic tilt cylinders, only one of which is shown at 34.

An example of drive system and other control systems with which the vehicle is fitted now will be described. The illustrated embodiment includes an EH drive system and, more specifically, a hydrostatic drive system, but the invention is also applicable, for example, to all-electric drive systems and systems having mechanical drives such as a continuously variable transmission (CVT). All such systems are characterized by a motive drive device that drives the tracks or wheels to propel the vehicle and a variable output drive control system that is controllable, in dependence on signals generated by the joystick(s) or other drive command devices, to supply power to the motive drive device at a controlled magnitude and direction. The drive control system is controlled by a drive control unit that is responsive to generated drive command signals. As discussed in more detail below in connection with the particular hydrostatic drive system detailed herein, the drive control unit is configured to control the drive control system to supply power the motive drive device(s) (left and right tracks in this embodiment) at a predetermined output that achieves a speed that is lower than that that which is commanded by the joysticks or other drive command device(s) for so long as an output of the drive control system is beneath a designated threshold, thereby maintaining vehicle speed lower than a commanded vehicle speed. The drive control unit is further configured to ramp up the power supply to the motive drive device(s) toward that which corresponds to that which is commanded by the drive command device(s) when the output of the drive control system is above the designated threshold, thereby causing the vehicle speed to approach a commanded vehicle speed. In the specific non-limiting example that will now be detailed, two motive drives are provided in the form of respective portions of a tandem pump, and the threshold output servicing as a break point for adaptive speed limiting control is a designated pump output indicative of a designated commanded drive speed percentage.

Figure 2:
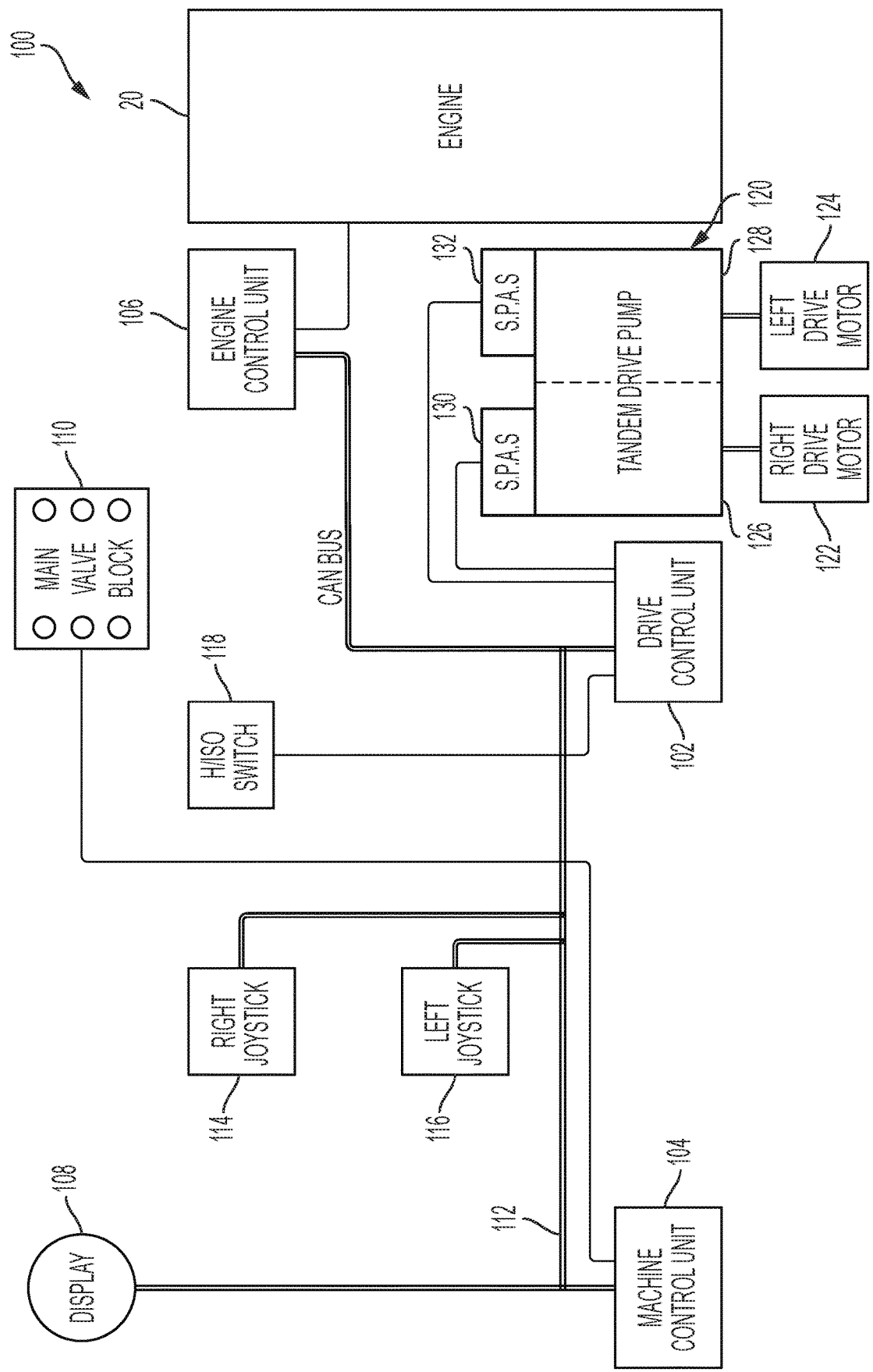
FIG. 2 schematically illustrates the electronically controlled components of the vehicle of FIG. 1.

A particular hydrostatic drive-based propulsion system with which the described adaptive speed limiting control can be implemented is illustrated using a drive control unit 102 shown schematically in FIG. 2. That system is part of a larger control system 100 that has a machine control unit 104 that controls the work devices of the machine such as lift, tilt and auxiliary devices, and an engine control unit 106 that has the ability to control the engine 20 and to relay information concerning the current operational state of the engine to one or both of the other control units 102 and 106. These control units may comprise individual electronic controllers (ECUs). Alternatively, many of the modules and logical structures described are capable of being implemented in software executed by a single ECU or of being implemented in hardware using a variety of components. Terms such as "controller" may include or refer to both hardware and/or software. Thus, the invention should not be limited to the specific examples or terminology or to any specific hardware or software implementation or combination of software or hardware.

Also shown in FIG. 2 are a display 108 and a main valve block 110. The display 108 may be a purely passive display that indicates the current operational state of the vehicle 10 including, for example, operational modes, engine RPM, etc. Display 108 may also take the form of a touch screen or other device providing operator controls. Notably, as discussed in more detail below, it lacks an operator-accessible speed limiting control, which instead is pre-programmed into the drive control unit 102 and which thus is effectively invisible to the operator. The main valve block 110 comprises a system of electric over hydraulic (EH) valves that are actuatable to control bucket lift and tilt as well as auxiliary functions of the vehicle 10.

In the present embodiment, a CAN BUS 112 or other wired or wireless communication link or combination of communication links permits communication between the machine control unit 104, the drive control unit 102, and the engine control unit 106. Each of these components can pass data to the other components connected to the CAN BUS 112. For example, as described in greater detail below, the left and right joysticks 114 and 116 transmit data (e.g., positional data, data related to the actuation of buttons included on the joysticks, etc.) to the drive control unit 102.

FIG. 2 also illustrates a pair of manually actuated drive command devices which, when actuated, generate drive command signals that are transmitted to the drive control unit. In the embodiment shown in FIG. 2, the drive command devices include a right joystick 114 and a left joystick 116 which communicate with at least the drive control unit 102, and possibly one or both of the machine control unit 104 and the engine control unit 106, via the CAN BUS 112. However, alternative drive command devices, such a steering wheel, one or more pedal(s) and/or one or more lever(s) could be employed instead of or in addition to the joysticks 114 and 116.

The joysticks 114 and 116 of this embodiment are movable to drive the machine. In the current implantation, the joysticks are both dual axis joysticks moveable both along a fore and aft or "Y" axis or a side-to-side or "X" axis. The joysticks 114, 116 can be operated in one of two modes by actuation of a switch 118. In the first, "H" mode, drive control is achieved solely through motion along the Y axis, with steering being a function of differential positioning of the joysticks along that axis. In the "ISO" mode, one joystick (typically the left joystick 116) controls all propulsion, with movement along the Y axis controlling straight travel and movement along the X axis controlling turning. The other joystick (typically the right joystick 114) controls other functions such as bucket lift and tilt. In either event, movement of the operative joystick(s) from a neutral joystick generates a signal that increases from 0 in the neutral position to a maximum value at maximum displacement. The drive control unit 102 receives the generated drive command signals and transmits a control signal to the pumps, possibly after scaling the drive command signal as described below.

Still referring to FIG. 2, the hydrostatic drive includes a hydrostatic pump assembly 120 having independent outputs for hydraulic drive motors 122 and 124 for the right and left tracks, respectively. The pump assembly 120 may comprise two (right and left) variable displacement pumps 126 and 128. These pumps are characterized by being able to provide a variable output depending on the position of an electronically actuated pump control device. Typical of such pumps are an "axial piston" pump the output of which is varied by rotating a swash plate under control of a servo-piston whose position is controlled by one or more solenoid valves under feedback. The swash plate is rotated from a 0 position to increase pump output by delivery of a "pump output control signal" to the swash plate solenoids. Delivery of appropriate pump output control signals to the swash plate control solenoids causes the servo-piston to rotate the swash plate either clockwise or counterclockwise from a zero position, in which no fluid is supplied to the associated drive motor, to a maximum that results in the delivery of maximum pump and propulsion of the associated track at full speed in either the forward or reverse directions. The pump output control signals that are delivered to the swash plate control solenoids are PWM signals the magnitude of which are generated by the drive control unit 102 based on the drive command signals generated by the joysticks 114 and 116.

Examples of pump controls applicable to the present system are Electrical Displacement Control (EDC) and Non-Feedback Proportional Electric Control (NFPE). In EDC, solenoids on each side of three-way four porting spool valve are controlled to vary an applied force on a spool that ports hydraulic pressure to a double acting servo-piston. Differential pressure across the servo-piston rotates the swash plate. Pump output varies essentially linearly with swashplate displacement. Pump output is dependent on pump flow rate and vehicle speed. In NFPE, control signals activate one of two proportional solenoids that port charge pressure to either side of the pump servo-cylinder. Pump displacement is proportional to the solenoid current signal level, but also depends upon pump input speed and system pressure. This dependency provides a power limiting function by reducing the pump swashplate angle as system pressure increases. Under both control schemes, pump output is dependent at least in part on the input pump output control signal That signal is scaled pursuant to the present invention.

But for the adaptive speed limiting control technique described herein, the steady—state pump output control signals that are delivered to the swash plate control solenoids always would be proportional to the generated drive command signals generated by the joysticks 114 and 116, resulting in pump output and, thus, drive speed, always being proportional to the magnitude of the generated drive command signal which, in turn, is proportional to joystick displacement from neutral. This control typically is openloop based on pre-mapped response of the swash plate to the delivered pump output control signal. Hence, while swash plate position sensors 130 and 132 may be provided for the right and left pumps 126 and 128, respectively, they typically are used for safety-related tasks rather than for operational pump control. In other implementations, the sensors 130 and 132 could be used for closed-loop control of the pumps, especially if the pumps are being controlled via NFPE control.

Referring still to FIG. 2, the engine control unit 106 is linked to the drive control unit 102 by the CAN BUS 112 so as to implement safety controls on the engine, such as shutting off the engine 20 upon the detection of error conditions by the drive control unit 102. Signals from the engine control unit 106 also can be transmitted to the drive control unit over 102 the CAN BUS 112 so as to, for example, adjust pump displacement in response to sudden pronounced changes in actual and commanded engine RPM.

As mentioned above, the hydrostatic drive system is provided with an adaptive speed limiting control feature. In accordance with this feature, the drive control unit 102 is configured to receive drive command signals from the joysticks 114 and 116, then scale the resulting pump output control signals downwardly, and then transmit the scaled pump output control signals to the swash plate control solenoids of the right and left pumps 126 and 128. The pumps 126 or 128 are controlled to supply hydraulic fluid to the associated drive motor 122,124 at a designated percentage of full output that is lower than that which is commanded by the associated joystick 114, 116 for so long as the pump output is below a designated percentage, and 2) ramp up the pump output toward the percentage that corresponds to the speed percentage commanded by the joystick 114, 116 when the pump output percentage. The threshold level and ramp function are "factory preset", meaning that they are stored in the drive control unit 102 on initial machine manufacture or by a skilled technician having administrator access to the drive control unit software rather than by an operator of the machine 10.

The pump output percentage threshold level, scaling factor, and ramp function are all machine-specific and subject to designer preference. As will become more apparent from the description of FIGS. 4-6 below, they are intended to reduce or prevent sharp accelerations or "jerks" upon changes in speed command and to provide enhanced responsiveness or fine controllability at low commanded speed. The scaling factor may, for example, be a function that simply limits the maximum pump output control signals to one limiting pump output to a designated percentage of one that otherwise would correspond to the speed commanded by the prevailing joystick position. The typical scaling factor is between 70-90%. Response is sluggish at values below 70%, and the benefits of scaling become virtually unnoticeable at values above 90%. The most typical scaling factor is 80%, meaning that the "scaled" pump output control signal that is delivered to the pump swash plate drive solenoids will be capped at 80% of the commanded pump output control signal for so long as the pump output percentage is below the designated threshold percentage. That scaling factor increases when the pump output exceeds the threshold percentage but, even at a 100% (unity) still can be considered as performing a scaling function.

The threshold pump output percentage must be lower than scaling factor that determines the speed limit value. This percentage is typically between 20% and 40%, and more typically about 30% below, the scaling factor. In the most typical case in which the scaling factor is 80%, the threshold pump output percentage will be about 30% lower than 80%, or about 50%.

The ramp function preferably is non-linear to avoid jerky motion. The curve defining the ramp function may decay over time so that the rate of pump output increase approaches zero as the actual pump output approaches the pump output corresponds to the speed commanded by joystick position.

Figure 3:
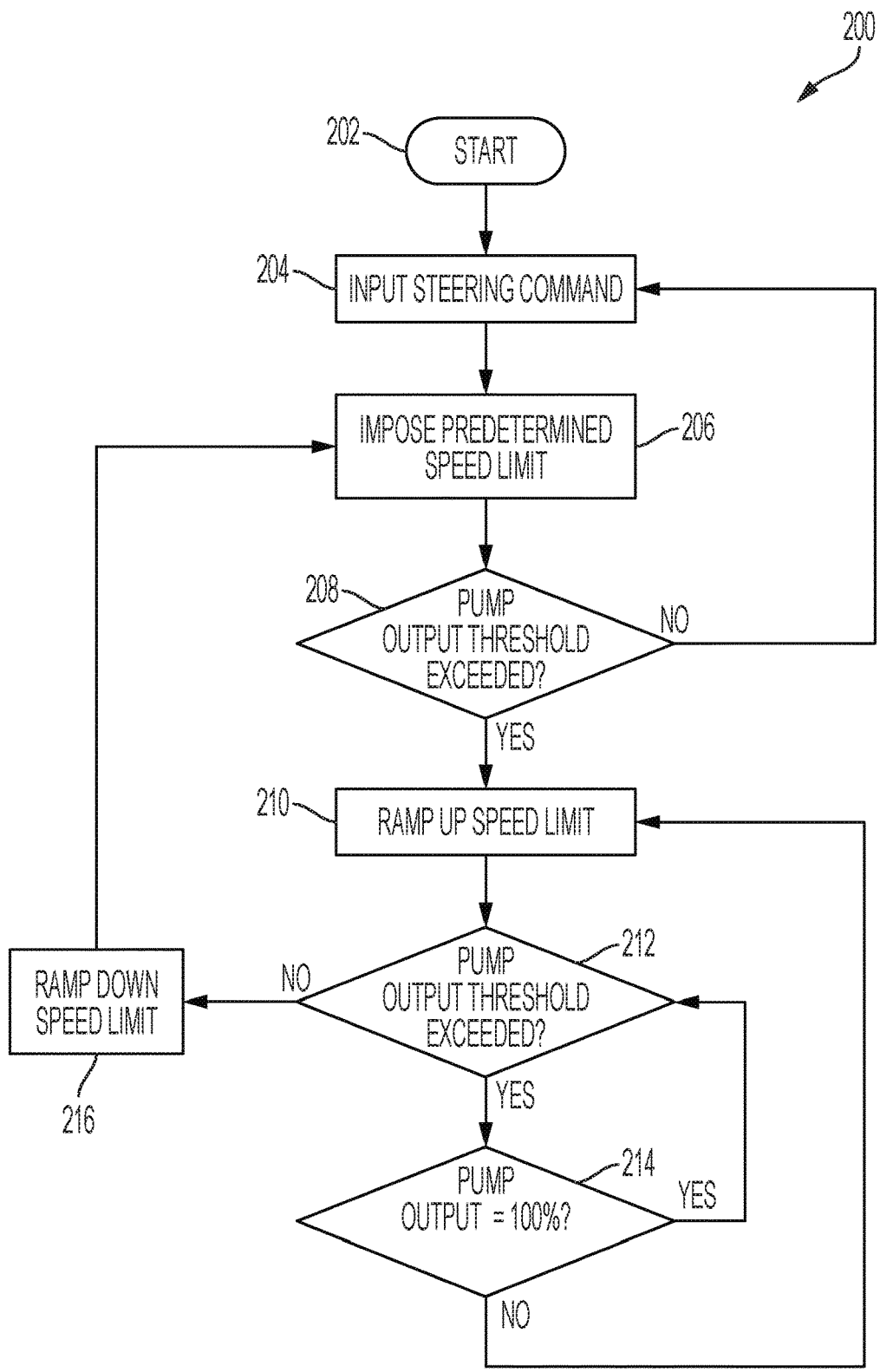
FIG. 3 is a flowchart of the operation of the propulsion control system of the vehicle of FIGS. 1 and 2; and Each of FIGS. 4-6 is a family of curves plotting drive command inputs and outputs at various times during vehicle operation.

An implementation of the described adaptive speed limiting technique is illustrated conceptually in process represented by the process 200 shown conceptually by the flowchart of FIG. 3. The process 200 is implemented by the drive control unit 102 of FIG. 2 to control pump output by controlling the pump swash plates through control of the swashplate control solenoids. The process 200 is identical for the left and right track drive systems. The description that follows applies to the left track drive system and applies to both "H" and "ISO modes of operations, it being understood that the process 200 is identical for the right track drive system. That process begins at Block 202 with the input of a drive command signal that is indicative of the position of the joystick 116. Adaptive speed limiting control through control of the drive signal to the pump swash plate control solenoid (hereafter "pump output control signal") is always implemented. This scaling comprises modifying the drive command signal received from the joystick 116 one that, depending on operating conditions, is lower than, typically a designated percentage of, the received drive command signal. As will become apparent below, in the illustrated embodiment, scaling occurs at a predesignated percentage (80%) in the specific example detailed herein unless and until the pump output surpasses the designated threshold. The scaling percentage thereafter decreases toward unity over time. The resulting scaled or modified PWM pump output control signals are then transmitted to the swash plate control solenoids.

The process 200 then proceeds to inquiry Block 208, where it is determined whether or not the pump output percentage is above the above-described threshold percentage. If not, the process 200 returns to Block 204, and scaling at the predesignated percentage (80% in this instance) continues regardless of joystick position. If so, the process 200 proceeds to Block 210, where the pump output control signal is increased to reduce pump output scaling and thus to reduce the speed limit, permitting the actual speed to increase toward the speed that is commanded by the prevailing joystick position. This speed limit reduction (or, stated another way, pump control signal scaling decrease and resultant) typically will take the form of a linear or non-linear curve rather than being discrete.

After the pump output control signal is ramped up for a brief period of time, typically on the order of less than one second, the process 200 proceeds to Block 212, where the process once again determines whether the pump output control signal exceeds the then-prevailing commanded pump output control signal determined by joystick position. If so, the process 200 proceeds to Block 214, where it is determined whether the pump output control signal and thus the pump output (and by association, vehicle speed) are at or near 100% of the commanded values. If the answer of that inquiry is NO, the process 200 returns to Block 210, where the pump output control signal is ramped up more before the process 200 again checks in Block 212 to determine whether the threshold pump output is exceeded. If the answer of the inquiry of Block 214 is YES, indicating that the pump output percentage is at 100%, the process 200 cycles between Blocks 212 and 214, to maintain the pump control signal and the pump output at 100%.

If, at any time during this control, the answer to the inquiry of Block 212 is NO, indicating that the pump output percentage exceeds the designated threshold, the speed limit again is ramped down by reducing the pump output control signal in Block 216. The process 200 then returns to the Block 206 to continue scaling at the predesignated, 80% rate, and the Process 200 proceeds as described above.

As a result of this control, pump output and vehicle speed are scaled at a non-unity value for so long as the pump output does not exceed a designated threshold, and scaling is ramped down toward unit after the designated pump output threshold is exceeded. Scaling, albeit sometimes at a 0 percent value, thus is performed at all times.

Figure 4:
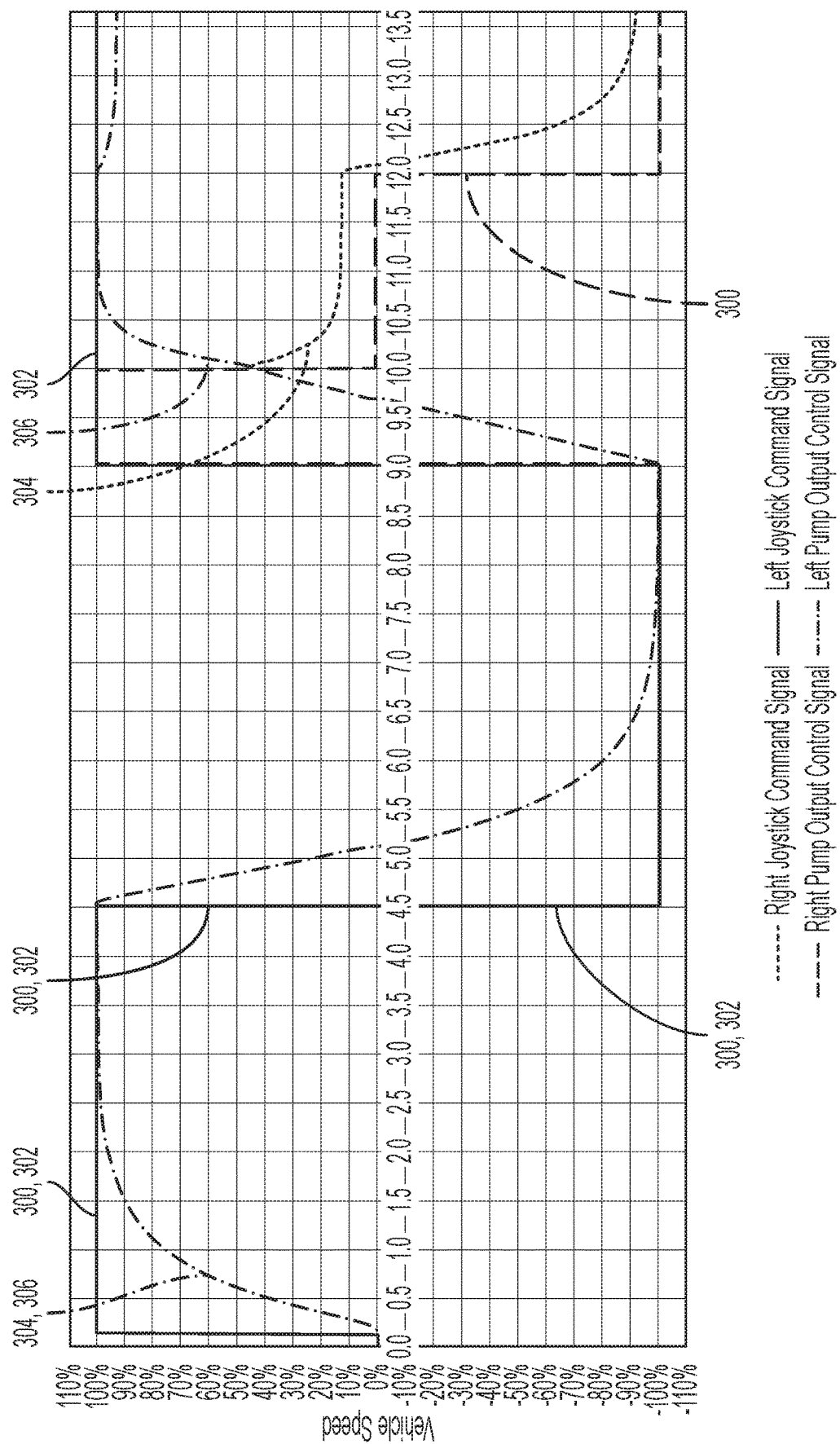
Figure 5:
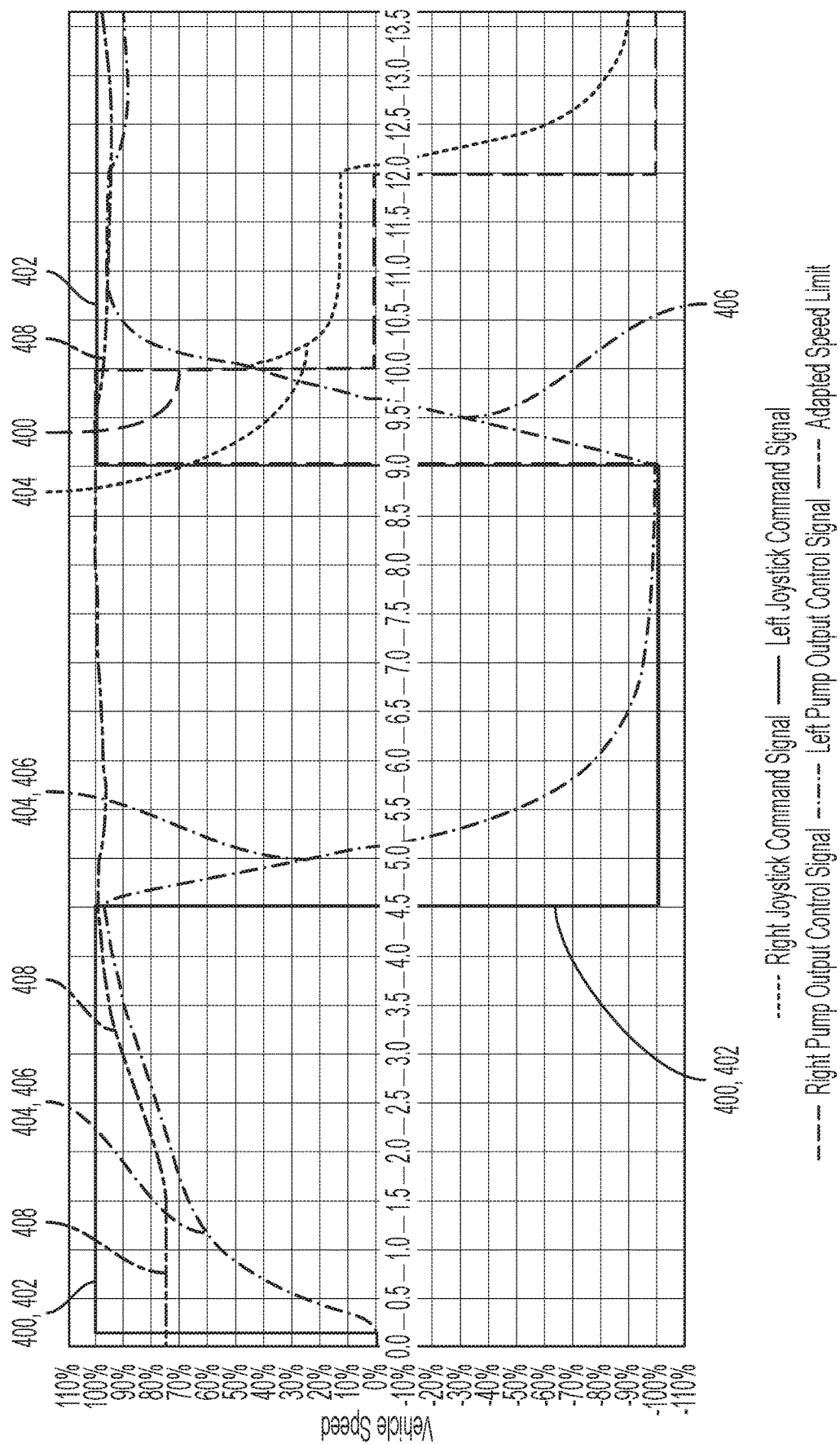
Figure 6:
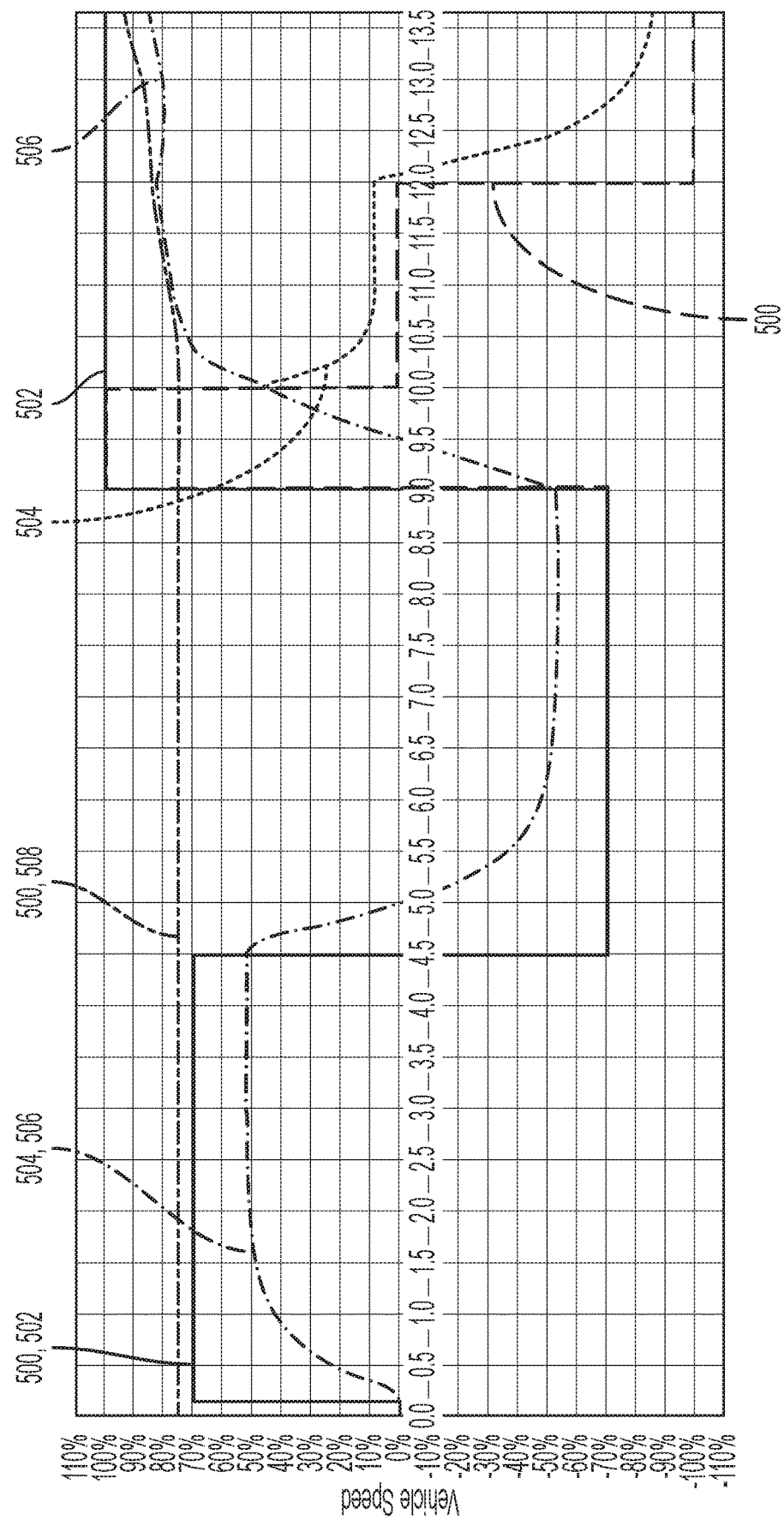

Practical implementation of the control technique described herein can be better understood with reference to the graphs of FIGS. 4-6.

Turning first to FIG. 4, operation of the system is described with the scaling factor set to 0, effectively disabling the described speed limiting control. This example shows propulsion at and turning at or near full speed during the illustrated operational cycle, reflecting typical operation around a worksite without performing functions such as scooping or dumping. Curves 300 and 302 designate the right and left joystick command signals, respectively. It should be noted that the "left" and "right" functions may be performed by both joysticks 114 and 116 if the system is operating in "H" mode and by a single joystick 114 or 116 if the system is operating in "ISO mode. Curves 304 and 306 designate the corresponding output control signals delivered to the pump swash plate solenoids. A two joystick or "H" control mode will be described for the sake of simplicity.

From time 0 to 4.5 seconds, the combined curve 300, 302 indicates that the joysticks 114 and 116 of FIG. 2 are translated essentially instantaneously from their neutral positions to their full-stroke positions, commanding full-speed linear forward propulsion. The drive signals for both pump swash plates then increase pursuant to an algorithm pre-programmed into the drive control unit 102 until the full speed travel is achieved at about time 2.5 seconds, as shown by the combined curve 304, 306. 100% pump output control signal percentage and 100% pump output percentage are generated at this time. The vehicle 10 is then propelled linearly forwardly at full speed until time 4.5 seconds, where the joysticks 114, 116 are controlled to command linear propulsion at full reverse speed as shown by the combined curve 300, 302. The drive control unit 102 again delivers pump output control signals to the swash plate drive solenoids in a pre-programmed curve as shown in the combined curve 304, 306 until the actual reverse speed equals the commanded speed at about time 8.0 seconds. The commanded pump control signal and thus the actual pump output percentage are at 100% in the reverse direction at tis time. These values are maintained to maintain vehicle propulsion at full reverse speed until time 9.0 seconds. At that time, both joysticks 114, 116 are again translated to their full-forward positions to commend linear forward maximum speed, and the pump output control signals are increased accordingly. Curve 300 shows that a right turn is commanded from time 10.0 seconds to time 13.5 seconds. The turn command of this example is stepped with a first commended value at time 10.0 seconds that is maintained until time 12.0 seconds, when it is increased to a maximum value. The pump output control signal delivered to the swash plate control solenoids for the right drive pump 126 reduces during this time pursuant to a predetermined algorithm as indicated by curve 304, and the pump output control signal for the swash plate control solenoids of the left drive pump 128 approaches and is maintained essentially at a maximum as designated by curve 306.

Turning now to FIG. 5, system response to the same inputs is shown when speed limiting is implemented by scaling the pump output control signals to the pump control solenoids to the predesignated 80% level so long as the pump output percentage remains below the above-described threshold which, in this example is 50%, of the pump swash plate opening percentage, corresponding to 50% of maximum drive speed. Curves 400 and 402 designates the right and left joystick drive command signals, respectively. Curves 404 and 406 designate the corresponding pump output signals delivered to the pump swash plate solenoids. Curve 408 designates the speed limiting control scaling factor as applied to the pump output control signals.

From time 0 to 4.5 seconds, the combined curve 400, 402 indicates that the joysticks 114, 116 are, as before, translated essentially instantaneously from their neutral position to their full stroke positions, commanding full-speed linear forward propulsion. The pump output control signals for both pump swash plates are then increased pursuant to an algorithm pre-programmed into the drive control unit 102 until the full speed travel is achieved at about time 2.5, seconds as shown by the combined curve 404, 406. However, instead of ramping up these signals to achieve a swash plate stroke corresponding to full vehicle speed, speed is limited pursuant to speed limiting or scaling curve 408, as implemented conceptually by Block 206 in FIG. 3. Comparing the combined curve 404, 406 of FIG. 5 to the combined curve 304, 306 of FIG. 4, the pump output control signal is maintained below the scaled drive input signal as indicated by curve 408 rather than ramping directly to that corresponding to the commanded speed, designated by the combined curve 400, 402.

At about time 1.5 seconds, the pump output percentage exceeds the threshold percentage, and the speed limiting curve 408 begins to ramp up. This function is reflected by Blocks 208 and 210 in FIG. 3. The combined pump output control curve 404, 406 increases accordingly, until both curves approach the one corresponding to the value commanded by the prevailing joystick positions at time 4.5 seconds. This ramp-up is reflected by Block 210 in FIG. 3.

Continuing to compare FIGS. 4 and 5, response to input commands after time 4.5 seconds is the same in both examples because the pump output percentage remains above the threshold, resulting in control with a scaling factor at or near 100% (virtually no reduction of the commanded speed signals) in the FIG. 5 example. Referring to FIG. 3, this control is reflected by the cycling between Blocks 212 and 214. The drive control unit 102 delivers pump drive control signals to the swash plate control solenoids in a pre-programmed curve as shown in the combined curve 404, 406 until the actual reverse speed equals the commanded speed at about time 7.5 seconds and maintain that speeds until time 9.0 seconds. At that time, both joysticks 114, 116 are again translated to their full-forward positions to command linear forward maximum speed, and the pump swash plate solenoid drive signals are increased accordingly. Curve 400 again shows that a stepped right turn is commanded from time 10.0 seconds to time 13.5 seconds. The pump output control signal to the solenoid for the right drive pump 126 reduces during this time pursuant to a predetermined algorithm as indicated by curve 404, and the output control signal for the left drive pump 128 approaches and is maintained essentially at a maximum as designated by curve 406. Again, since the actual pump output percentage exceeds the designated value, scaling remains at or near 100% during this time period.

Another example with more pronounced speed limiting is illustrated graphically in FIG. 6. In this example, vehicle speed (as reflected by the commanded pump output control signal percentage) is maintained below the speed limited threshold for the entire cycle of operation, as likely would be the case during work functions such as dumping a load into a truck. Pump output also is maintained below the designated threshold for nearly the entire operational cycle.

From time 0 to 4.5 seconds, the combined curve 500, 502 indicates that the joysticks 114, 116 are translated essentially instantaneously from their neutral position to an intermediate position commanding a speed lower than that reflected by the speed limiting curve 508. The pump output control signals for both pump swash plates are then ramped-up pursuant to an algorithm pre-programmed into the drive control unit 102 until a final speed is achieved at about time 1.5 seconds, as shown by the combined curve 504, 506. However, as with the Example of FIG. 5, instead of ramping up these signals to achieve a swash plate stroke corresponding to the commanded vehicle speed, speed is limited to a percentage, in this case 80%, of the commanded speed pursuant to speed limiting curve 508, This control is implemented conceptually by Block 206 in FIG. 3. The actual vehicle speed percentage, as reflected by the the pump output control signal, remains at this level until time 4.5 seconds, where the joysticks 114 and 116 are translated to a position commanded straight rearward travel at about 70% of full speed. See combined curve 500, 502. The drive control unit 102 delivers pump drive control signals to the swash plate control solenoids in a pre-programmed curve as shown by the combined curve 504, 506 until the actual reverse speed equals the scaled or predetermined percentage (80% in this example) of the commanded speed at about time 6.0 seconds, and maintains that speeds until time 9.0 seconds.

At that time, both joysticks 114 and 116 are translated to their full-forward positions to command linear forward propulsion at maximum speed as reflected by the combined curve 500, 502. The pump output control signals delivered to the swash plate solenoids are increased accordingly, again pursuant to an algorithm prestored in the drive control unit 102. See the combined curve 504, 506. At about time 10.5 seconds, the pump output percentage crosses the designated threshold, and the scaling factor as indicated by curve 508 begins to increase. Curve 500 again shows that a stepped right turn is commanded from time 10.0 seconds to time 13.5 seconds. The pump output control signal to the solenoid for the right drive pump 126 reduces during this time pursuant to predetermined algorithm as indicated by curve 504, and the output control signal for the left drive pump 128 approaches and is maintained essentially at a maximum as designated by curve 506. That increase as ramped and maintained below the ramping scaled value 508 rather than increasing to the value commanded by left joystick position. This control thus indicates control represented by Blocks 210, 212, and 214 in FIG. 3, with the answer the inquiry of Block 214 being NO in all instances.

It should be noted that speed limit scaling as discussed above could be used to limit drive parameters other than speed. For example, the same protocols could be used to limit acceleration or even jerk. In the case of acceleration, the same factor used to scale the joystick inputs would be used to adjust the allowable acceleration limits downwardly.

The disclosed invention thus allows full speed and aggressive operation of the machine while automatically scaling down the operator inputs for fine control at lower speeds. Alternation between high speed operation and lower speed fine control operation happens seamlessly in the background with no input from the operator other than drive commands.

Although the best mode contemplated by the inventors of carrying out the present invention is disclosed above, practice of the present invention is not limited thereto. It is appreciated that various additions, modifications and rearrangements of the aspects and features of the present invention may be made in addition to those described above without deviating from the spirit and scope of the underlying inventive concept. The scope of some of these changes is discussed above.

I claim:

1. A utility vehicle comprising:
   a. a chassis;
   b. at least first and second laterally-spaced driven ground supports that support the chassis on the ground;
   c. an engine that is supported on the chassis;
   d. a motive drive device that is supported on the chassis and that is operatively coupled to the engine and to at least one ground support, the motive drive device being configured to drive the at least one ground support to propel the vehicle over the ground;
   e. a drive control system including
      i. an electronic controller;
      ii. a manually actuated drive command device that is electronically coupled to the electronic controller to generate a drive command signal a magnitude of which is dependent upon a degree of actuation of the drive command device;
      iii. a drive control system that is coupled to the electronic controller, to the engine, and to the motive drive device and that supplies motive power to the at least one motive drive device, wherein the electronic controller is configured to control the drive control system to
         1. supply power to the motive drive device at a predetermined output that is lower than that that which is commanded by the drive command device for so long as an output of the drive control system is beneath a designated threshold, thereby maintaining vehicle speed lower than a commanded vehicle speed, and
         2. control the drive control system to ramp up the power supply to the motive drive device toward that which is commanded by the drive command device when the output of the drive control system is above the designated threshold, thereby causing the vehicle speed to approach a commanded vehicle speed.

2. The utility vehicle as recited in claim 1, wherein the motive drive device is a hydraulic motor, and wherein the drive control system includes
   a pump that is driven by the engine and that has an output that is fluidically coupled to the hydraulic motor, and
   a pump output control device that is in in electronic communication with the electronic controller and that can be actuated to adjust pump output, and wherein the electronic controller is configured to deliver a pump output control signal to control the pump output control device to 1) cause the pump to supply fluid at a scaled pump output level that is lower than a pump output level which is commanded by a drive command signal generated by the drive command device for so long as a prevailing pump output level is below a designated threshold and to 2) ramp up the pump output level toward the level that is commanded by the drive command device when the prevailing pump output level rises above the designated threshold.

3. The utility vehicle as recited in claim 2, wherein the vehicle includes first and second laterally spaced, independently controlled ground supports and first and second manually actuated drive command devices.

4. The utility vehicle as recited in claim 3, wherein each ground support comprises one of a wheel and a track assembly.

5. The utility vehicle as recited in claim 3, wherein each drive command device comprises a joystick.

6. The utility vehicle as recited in claim 2, wherein the designated threshold is a designated percentage of a maximum pump output level.

7. The utility vehicle as recited in claim 6, wherein the designated percentage corresponds to a percentage of a maximum pump output control signal that can be delivered by the electronic controller.

8. The utility vehicle as recited in claim 6, wherein the designated percentage is factory pre-set and stored in the controller.

9. The utility vehicle as recited in claim 6, wherein the scaled pump output level is a designated percentage of a pump output percentage corresponding to a percentage of a maximum speed commanded by the generated drive command signal.

10. The utility vehicle as recited in claim 2, wherein the electronic controller is configured such that, when the prevailing pump output level rises above the designated threshold, the pump output rises at a non-linear rate.

11. The utility vehicle as recited in claim 2, wherein the pump output control device comprises a swash plate.

12. The utility vehicle as recited in claim 2, wherein the electronic controller is configured to control the pump to scale the drive command signal to adjust the allowable acceleration limits downwardly.

13. The utility vehicle as recited in claim 1, wherein the electronic controller is configured to control the drive control system by scaling an output signal that is generated by the drive command device and then delivering the scaled output signal to the drive control system.

14. The utility vehicle as recited in claim 1, wherein the vehicle is one of a skid-steer loader and a track loader.

15. A utility vehicle comprising:
　a. a chassis;
　b. at least first and second laterally-spaced driven ground supports that support the chassis on the ground, each ground support comprising at least one of a wheel and a track;
　c. an engine that is supported on the chassis;
　d. first and second hydraulic drive motors, each of which is supported on the chassis, is operatively coupled to the engine, and is operatively coupled to a respective one of the first and second ground supports, the drive motors being configured to drive the ground supports to propel the vehicle over the ground and to steer the vehicle;
　e. an electronic over hydraulic control system including
　　i. an electronic controller;
　　ii. a pump assembly that is fluid communication with the first and second hydraulic drive motors, the pump assembly including a pump output control device that is in electronic communication with the electronic controller and that can be actuated to adjust pump output; and
　　iii. first and second manually-actuated joysticks which are configured to control operation of the first and second drive motors, wherein the electronic controller is configured to
　　　1. receive drive command signals from the joysticks, and
　　　2. transmit drive signals to the pump output control devices in dependence on the received drive command signals, wherein the electronic controller is configured to receive drive command signals from the joysticks, then scale the drive command signals to generate pump output control signals that are calculated to propel the vehicle at a designated limited percentage of a drive speed commanded by the then-prevailing joystick positions, and to then transmit the pump output control signals to the pump output control device so as to
　　　　1) cause the pump output supplied to the drive motors to remain below a designated percentage at or below that which would propel the vehicle at the designated limited speed percentage for so long as a prevailing pump output is beneath a designated percentage of a maximum pump output, and
　　　　2) cause the pump output supplied to the drive motors to ramp up toward an output level that would propel the vehicle at an actual speed commanded by the joysticks when the prevailing pump output percentage is above the designated percentage.

16. The utility vehicle as recited in claim 15, wherein the designated percentage is factory pre-set and stored in the electronic controller.

17. The utility vehicle as recited in claim 15, wherein the electronic controller is configured such that, when the pump output rises above the designated percentage, the pump output percentage is controlled to increase at a non-linear rate.

18. A method of operating a utility vehicle including a chassis, at least first and second laterally-spaced driven ground supports that support the chassis on the ground, each ground support device comprising at least one of a track and a wheel, an engine that is supported on the chassis, and a motive drive device that is supported on the chassis and that is operatively coupled to the engine and to at least one of the ground supports, the motive drive device being configured to drive the at least one ground support to propel the vehicle over the ground, the method comprising:
　a. manually translating a drive command device that is electronically coupled to an electronic controller to generate a drive command signal a magnitude of which is dependent upon a degree of actuation of the drive command device, thereby commanding a vehicle speed; and, in response to the translating
　b. using the electronic controller, controlling a drive control system to
　　1) power the motive drive device at a predetermined output that is lower than that that which is commanded by the drive command device for so long as an output of the drive control system is beneath a designated threshold, thereby maintaining vehicle speed lower than the commanded vehicle speed, and
　　2) ramp up the power supply to the motive drive device toward that which is commanded by the drive command device when the output of the drive control system is above the designated threshold, thereby causing the vehicle speed to approach the commanded vehicle speed.

19. The method as recited in claim 18, wherein the motive drive device is a hydraulic motor, and wherein the drive control system includes a pump that is driven by the engine and that has an output that is fluidically coupled to the hydraulic motor, and a pump output control device that is in in electronic communication with the electronic controller and that can be actuated to adjust pump output, and wherein the electronic controller is configured to deliver a pump output control signal to control the pump output control device to 1) cause the pump to supply fluid at a scaled level that is lower than that which is commanded by the drive command signal generated by the drive command device for so long as a prevailing the pump output is below a designated threshold level and to 2) cause the pump output to ramp up toward the level that is commanded by the drive command when prevailing the pump output is above the designated threshold level.

20. The method as recited in claim 19, wherein the designated threshold level is a threshold percentage of a maximum pump output, and wherein, when the prevailing pump output is above the threshold percentage, the pump output pressure percentage is controlled to rise at a non-linear rate.

\* \* \* \* \*